Feb. 21, 1967
I. L. PATTERSON 3,305,778
ADJUSTABLE SUPPORT AND LOCKING MEANS FOR MIRROR
TYPE GALVANOMETERS
Filed March 25, 1963
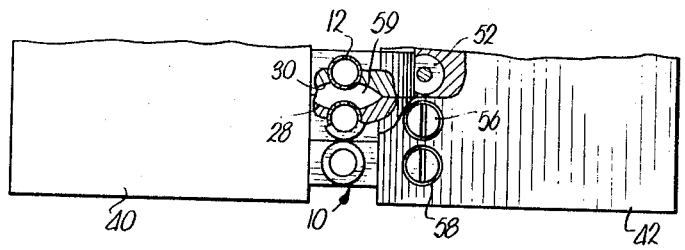
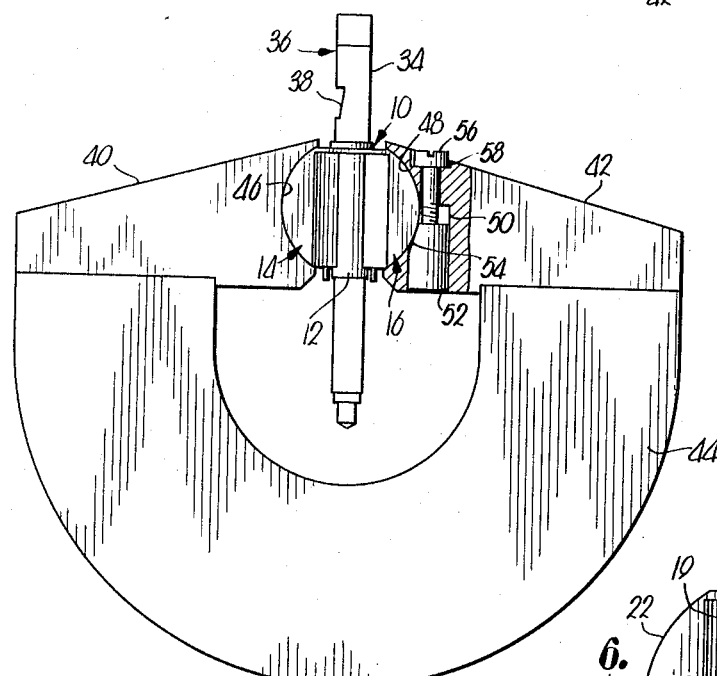
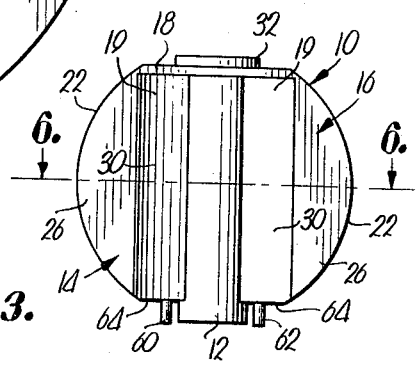
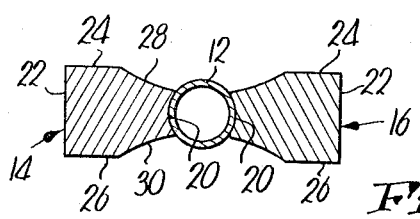
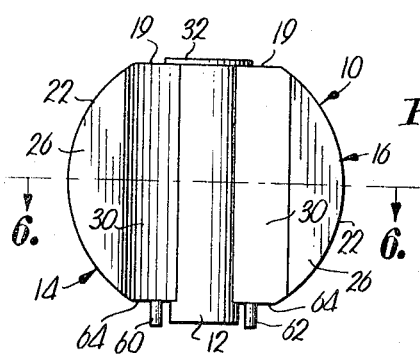
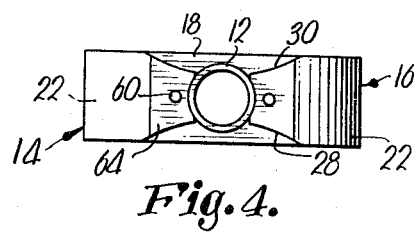
INVENTOR.
Irvin L. Patterson
BY
Hovey, Schmidt, Johnson & Hovey
ATTORNEYS.

United States Patent Office 3,305,778
Patented Feb. 21, 1967

3,305,778
ADJUSTABLE SUPPORT AND LOCKING MEANS FOR MIRROR TYPE GALVANOMETERS
Irvin L. Patterson, Tulsa, Okla., assignor to Midwestern Instruments, Inc., Tulsa, Okla., a corporation of Oklahoma
Filed Mar. 25, 1963, Ser. No. 267,629
10 Claims. (Cl. 324—97)

This invention relates to improvements in galvanometer inserts or mounting elements such as shown in Atchley et al., U.S. Letters Patent No. 2,873,429, dated February 10, 1959.

It is the primary object of this invention to provide an improvement in galvanometer mounting structure such as illustrated in the aforesaid patent. To this end, an improved galvanometer insert is provided having low magnetic reluctance and formed of a single material instead of laminations as shown in said patent.

It is another object of this invention to provide improved fastening means for use in conjunction with the galvanometer insert whereby only a single adjustment is required rather than multiple adjustments as in the aforesaid patent. In accomplishing this object the instant invention provides a pair of spaced-apart, flux-carrying members presenting opposed faces in engagement with the insert, one of said members being provided with clamp means including a shiftable wedge having a beveled portion forming a continuation of the respective face.

It is another object of this invention to provide an insert for receiving a galvanometer and mounting the same between a pair of flux-carrying members wherein an air gap is provided between successive inserts to permit a bank of galvanometers to be formed with the inserts of the galvanometers in abutting relationship.

It is still another object of this invention to provide a galvanometer insert wherein the metallic portion thereof is a one-piece, magnetic body composed of two elements secured to a galvanometer-receiving bushing on diametrically opposed sides of the bushing, and a web interconnecting the elements, the thickness of the web being small relative to the corresponding dimensions of the elements.

It is yet another object of this invention to provide a galvanometer insert as in the last-mentioned object wherein such web is disposed at one end of the insert and said bushing is composed of a yieldable material permitting the ends of the elements remote from the web to move toward one another when the insert is clamped between a pair of flux-carrying members to thereby hold the galvanometer in place.

Other objects will become apparent as the detailed description proceeds.

In the drawing:
FIGURE 1 is a side elevational view of the mounting structure;
FIG. 2 is a fragmentary, top view partially in section and partially in elevation showing a bank of galvanometers mounted in place by the instant invention;
FIG. 3 is a side elevational view of one embodiment of the insert of the present invention;
FIG. 4 is an end view of the insert of FIG. 3;
FIG. 5 is a side elevational view of another embodiment; and
FIG. 6 is a sectional view taken along line 6—6 of FIGS. 3 and 5.

Referring to FIGS. 1–4 and 6, one embodiment of the insert is shown at 10. Insert 10 comprises a yieldable bushing or sleeve 12, a pair of elements 14 and 16, and a web, 18 interconnecting elements 14 and 16 at the upper ends 19 thereof. Elements 14 and 16 each have an inner, elongated transversely concave edge 20 engaging bushing 12; an outer edge 22; and a pair of opposed sides 24 and 26. Outer edge 22 is longitudinally convex and transversely straight, the convexity of the edge being in a plane through the axis of the bushing. Sides 24 and 26 converge toward one another as bushing 12 is approached, and are provided with converging surfaces 28 and 30 respectively.

Web 18 interconnects the upper ends of elements 14 and 16 and has an opening therein receiving bushing 12. The bushing is provided with an annular flange 32 which is flush with the top of the web. Bushing 12 receives the tube 34 of a galvanometer 36 which may be of the type as shown and described in U.S. Letters Patent to Morrow, No. 2,651,756, dated September 8, 1953.

The galvanometer is provided with a pair of pole pieces (not shown) within tube 34 which are aligned with elements 14 and 16 when the galvanometer is inserted into bushing 12. A notch 38 in tube 34 forms an opening and permits the optics of the oscillograph or other recording instrument to be aligned with the mirror within the galvanometer. Those skilled in the art will, therefore, appreciate that the purpose of the structure shown is to permit positioning of the galvanometer so that it will be properly aligned with the optics of the instrument.

The oscillograph or other instrument is provided with a pair of flux-carrying members 40 and 42 which direct magnetic flux from a permanent magnet diagrammatically illustrated at 44. Member 40 has a face 46 in complemental engagement with edge 22 of element 14. Similarly, member 42 is provided with a face 48 in complemental engagement with edge 22 of element 16. A passage 50 in member 42 receives a wedge or plug 52 which is provided with a beveled portion 54 forming a continuation of face 48. Plug 52 contains a tapped hole (not shown) which receives the external threads of a take-up fastener or bolt 56. Fastener 56 is inserted into an opening 58 in member 42 which communicates with passage 50. Opening 58 may be enlarged to permit the head of the fastener to be recessed in member 42 as clearly shown in FIG. 1.

FIGURE 2 illustrates a bank of galvanometers and shows the significance of the converging surfaces 28 and 30 on the respective sides of the elements. This convergence provides an air gap 59 between successive, abutting inserts and thus directs the magnetic flux to the pole pieces of the galvanometers. Although elements 14 and 16 and web 18 comprise a monolithic body of magnetic material, the web does not impair the magnetic properties of the insert since it is extremely thin relative to the corresponding dimensions of the elements. Therefore, web 18 saturates at a low flux density and permits the flux to flow to the galvanometer pole pieces by way of the elements 14 and 16.

Referring to FIG. 5, a second embodiment of the present invention is shown. The structure of FIG. 5 is identical with that of the other figures except that the web 18 is omitted. In this embodiment the elements 14 and 16 are separate pieces cemented to diametrically opposed sides of bushing 12.

In the operation of the invention, the galvanometer 36 is inserted into bushing 12 until the pole pieces of the galvanometer are aligned with elements 14 and 16. The interior diameter of the bushing is of appropriate size to permit insertion of the galvanometer and yet hold the same in place during adjustment of the mounting structure.

The tube 34 of galvanometer 36 may be rotated about its longitudinal axis within bushing 12 to align the galvanometer mirror within opening 38 with the optics of the oscillograph or other instrument. The invention then permits the longitudinal axis of the galvanometer to be displaced by rotating insert 10 in the plane of the drawing of FIG. 1. It may be appreciated that this plane corresponds with the convexities of outer edges 22 of elements 14 and 16. When desired inclination of the galvanometer is obtained by rotating the insert, fastener 56 is rotated to forceably engage beveled portion 54 of wedge 52 with the outer edge 22 of element 16. This action forces the lower ends of elements 14 and 16 toward one another due to the yieldability of bushing 12. Web 18 does not inhibit this clamping action since it is sufficiently thin to permit flexure thereof. The galvanometer is thus securely gripped by the bushing and, simultaneously, insert 10 is held against rotation relative to members 40 and 42.

In the embodiment of FIG. 5, the operation of the invention is identical with that as above described. Pins 60 and 62, integral with elements 14 and 16, respectively, depend from the lower ends 64 thereof and are provided on both embodiments as physical stops for preventing excessive rotation of insert 10 when the galvanometer is removed therefrom.

Being of homogeneous material, the invention permits ease of construction while maintaining proper isolation between adjacent galvanometers when a plurality of inserts 10 are mounted in abutting relationship between members 40 and 42 as illustrated in FIG. 2. Furthermore, the invention provides reduced reluctance to the flow of magnetic flux from the flux-carrying members 40 and 42 to the pole pieces of the galvanometer as compared with prior structures such as shown in Atchely et al, supra. The elements 14 and 16 are solid pieces of magnetic material containing no indentations or other interruptions in the contours thereof which would increase the reluctance of the magnetic circuit. Therefore, an increase in the intensity of the magnetic flux across the pole pieces of the galvanometer is achieved over the prior art without increasing the field strength of magnet 44.

A further advantage of the instant invention lies in the fact that only a single adjustment is required to rigidly secure the insert in proper position between the flux-carrying members. Fastener 56 achieves this and it may be appreciated that the fastener is disposed adjacent the side of the galvanometer opposite from opening 38. Therefore, the screwdriver or wrench employed to adjust fastener 56 is not in the optical path of the instrument and therefore, the operator may continuously observe the alignment of the galvanometer with the optics of the instrument without removal of the wrench or screwdriver from the fastener. Furthermore, the axis of rotation of the fastener is parallel with the longitudinal axis of the galvanometer and in closely spaced relationship thereto which renders the fastener accessible through the same access opening as that employed for the insertion of the galvanometer into the instrument.

Having thus described the invention, what is claimed as new and desired to be secured by Letters Patent is:

1. In magnet structure for directing magnetic flux to the pole pieces of a tubular mirror type galvanometer; a pair of spaced-apart, flux-carrying members; and an insert disposed between said members, said insert comprising an elongated, nonmagnetic bushing adapted to receive the galvanometer, a pair of magnetic elements separate from the galvanometer and secured to said bushing in diametrically opposed relationship thereto and each having a pair of ends spaced longitudinally thereof, and a thin, magnetic web integral with said elements and interconnecting one end of one of the elements with the corresponding end of the other element whereby the elements and the web form a monolithic body of magnetic material, the thickness of the web being small relative to the length of each element between the ends thereof, whereby the web saturates at a low flux level relative to the elements thereby leaving the magnetic properties of the insert unimpaired, each of said elements being provided with a pair of opposed sides and an outer, convex edge, one of said sides converging toward the other side as the bushing is approached, each of the members presenting a face in complemental engagement with a corresponding edge, whereby the insert is rotatable with respect to the members.

2. The device of claim 1 further having sides of each of said elements converging toward one another.

3. The device of claim 1 further having said bushing comprising an elongated sleeve, each element having an inner, elongated, transversely concave edge engaging the sleeve.

4. The device of claim 1 further having said outer edges being longitudinally convex, the convexities of said edges and the axis of the bushing being in a common plane.

5. The device of claim 4 further having said outer edges being transversely straight.

6. The device of claim 1 further having one of said members being provided with releasable means for forceably engaging the corresponding edge to hold the insert in a preselected position.

7. The device of claim 6 further having said bushing being yieldable, whereby engagement of said releasable means with the insert compresses the the bushing to rigidly hold the galvanometer.

8. The device of claim 1 further having one of said members being provided with clamp means including a shiftable wedge, a portion of the wedge forming a continuation of the respective face, whereby movement of said portion into tight engagement with the corresponding edge holds the insert in a preselected position.

9. The device of claim 1 further having one of said members being provided with a shiftable plug having a beveled portion forming a continuation of the respective face and a take-up fastener in engagement with said plug for moving the plug toward and away from the corresponding edge, whereby movement of said portion into tight engagement with the corresponding edge holds the insert in a preselected position.

10. The device of claim 9 further having said fastener including rotatable means operable to shift said plug, the axis of rotation of said means being substantially parallel with the longitudinal axis of the bushing.

References Cited by the Examiner
UNITED STATES PATENTS

| | | | |
|---|---|---|---|
| 2,389,081 | 11/1945 | Redmond | 324—97 |
| 2,873,429 | 2/1959 | Atchley | 324—97 X |
| 3,204,182 | 8/1965 | Picard | 324—97 |

WALTER L. CARLSON, *Primary Examiner.*

RUDOLPH V. ROLINEC, *Examiner.*